United States Patent
Nassif

(12) United States Patent <br>
Nassif

(10) Patent No.: US 7,293,496 B2 <br>
(45) Date of Patent: Nov. 13, 2007

(54) HYDRAULIC LINEAR DRIVE OF A TRANSMISSION ACTUATOR

(75) Inventor: Serge Nassif, Mundolsheim (FR)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/191,918

(22) Filed: Jul. 29, 2005

(65) Prior Publication Data

US 2006/0021501 A1    Feb. 2, 2006

(30) Foreign Application Priority Data

Jul. 30, 2004    (DE) .................. 10 2004 037 116

(51) Int. Cl.
*F01B 31/00* (2006.01)
*F16J 10/00* (2006.01)

(52) U.S. Cl. ..................... 92/86.5; 92/169.1

(58) Field of Classification Search .............. 92/86.5, 92/169.1, 182, 183, 185; 277/438, 447, 467, 277/470, 581, 583

See application file for complete search history.

(56) References Cited

U.S. PATENT DOCUMENTS 3,312,149 A * 4/1967 Fleckenstein et al. ....... 277/566
4,342,336 A * 8/1982 Satterthwaite et al. ...... 277/467
5,079,997 A * 1/1992 Hong ........................ 92/183
6,283,156 B1 * 9/2001 Motley ....................... 138/89

OTHER PUBLICATIONS

Translation of German Publication mentioned in Specification entitled: "Toothed Gearing", Second Edition vol. 26, Springer Verlag, 5 pages.

* cited by examiner

*Primary Examiner*—Michael Leslie <br>
(74) *Attorney, Agent, or Firm*—Crowell & Moring LLP

(57) ABSTRACT

A hydraulic linear drive, in particular for a hydraulic transmission actuator, has a piston/cylinder unit in which an adjusting piston is situated so that it is longitudinally displaceable in a cylinder housing and divides a cylinder space into at least two pressure spaces. The pressure spaces can be acted upon by hydraulic oil via controllable pressure supply through hydraulic lines. A sealing ring is situated on the adjusting piston or on the cylinder housing for sealing, the two pressure spaces with respect to one another. The sealing ring is accommodated in a ring groove on the cylinder housing so as to seal with its inside against the adjusting piston. A sealing pressure supply system communicates hydraulic oil to the outside of the sealing ring so as to control the sealing pressure of the sealing ring on the piston surface.

19 Claims, 1 Drawing Sheet

HYDRAULIC LINEAR DRIVE OF A TRANSMISSION ACTUATOR

BACKGROUND AND SUMMARY OF THE INVENTION

This application claims the priority of German Application No. 10 2004 037 116.4 filed Jul. 30, 2004, the disclosure of which is expressly incorporated by reference herein.

This invention relates to a hydraulic linear drive, of a hydraulic transmission actuator. Preferred embodiments of the invention relate to a hydraulic linear drive for a transmission actuator comprising a piston/cylinder unit in which an adjusting piston is arranged in a cylinder housing so that the piston is longitudinally displaceable and divides a cylinder housing space into at least two pressure spaces, hydraulic lines communicating hydraulic oil through hydraulic lines leading to the pressure spaces, and a sealing element arranged on one of the adjusting piston and the cylinder housing for mutually sealing the two pressure spaces with respect to one another.

Hydraulic linear drives are used, for example, in automatic transmissions for synchronizing the gears (see, for example, Johannes Loomann, Zahnradgetriebe [Toothed Gears], $2^{nd}$ edition, pages 156 ff.).

With the generic hydraulic linear drives, the double piston bordered by two pressure spaces is displaced to the left or right by a pressure acting accordingly, with the two pressure spaces being sealed in many applications by sealing elements provided on the outer circumference of the piston.

In hydraulic transmission actuators in particular, high adjusting forces are applied in synchronization of the gear wheels, requiring reliable and permanent sealing and/or separation of the two pressure spaces.

An object of the present invention is therefore to improve upon the sealing of the two pressure spaces in the area of the piston/cylinder unit. This object is achieved according to certain preferred embodiments of the invention by providing a linear drive for a transmission actuator comprising a piston/cylinder unit in which an adjusting piston is arranged in a cylinder housing so that the piston is longitudinally displaceable and divides a cylinder housing space into at least two pressure spaces, hydraulic lines communicating hydraulic oil through hydraulic lines leading to the pressure spaces, and a sealing element arranged on one of the adjusting piston and the cylinder housing for mutually sealing the two pressure spaces with respect to one another, wherein the sealing element is a sealing ring accommodated in a ring groove on the cylinder housing and sealed on its inside with respect to the adjusting piston and which can be acted upon by hydraulic oil on its outside.

Due to a pressure acting on the sealing ring accommodated in a peripheral groove in the cylinder housing, a sealing force is additionally exerted on it, ensuring a reliable sealing of the two pressure spaces separated by the adjusting piston.

Additional advantageous embodiments and refinements of the hydraulic linear drive are possible through the features described herein and in the claims.

A particularly effective seal is obtained according to certain embodiments of the invention when the sealing ring has a groove with a V-shaped cross section on its outside, while the cross section on the inside tapers in the direction of the adjusting piston. The contact pressure of the sealing ring against the adjusting piston is thus increased due to the linear pressure thereby generated.

For the sealing ring to be acted upon by hydraulic oil during the adjustment of the piston, the pressure difference between the two pressure spaces is picked up in an advantageous manner and sent via a pressure balance to the sealing ring on its outside according to certain preferred embodiments of the invention.

As an alternative to the permanent hydraulic oil feed described above, with the help of a switching valve, the pressure supply to the sealing ring may be designed to be controllable. The advantage of an additional hydraulic seal that can be activated and deactivated any number of times is that when using the hydraulic linear drive as a hydraulic transmission actuator, for example, the sealing ring is acted upon by hydraulic oil only during the synchronization phase during which higher adjusting forces must be applied.

Two exemplary embodiments of this invention are depicted in the drawing and are described in greater detail below.

Other objects, advantages and novel features of the present invention will become apparent from the following detailed description of the invention when considered in conjunction with the accompanying drawings.

DETAILED DESCRIPTION OF THE DRAWINGS

Figure 1:
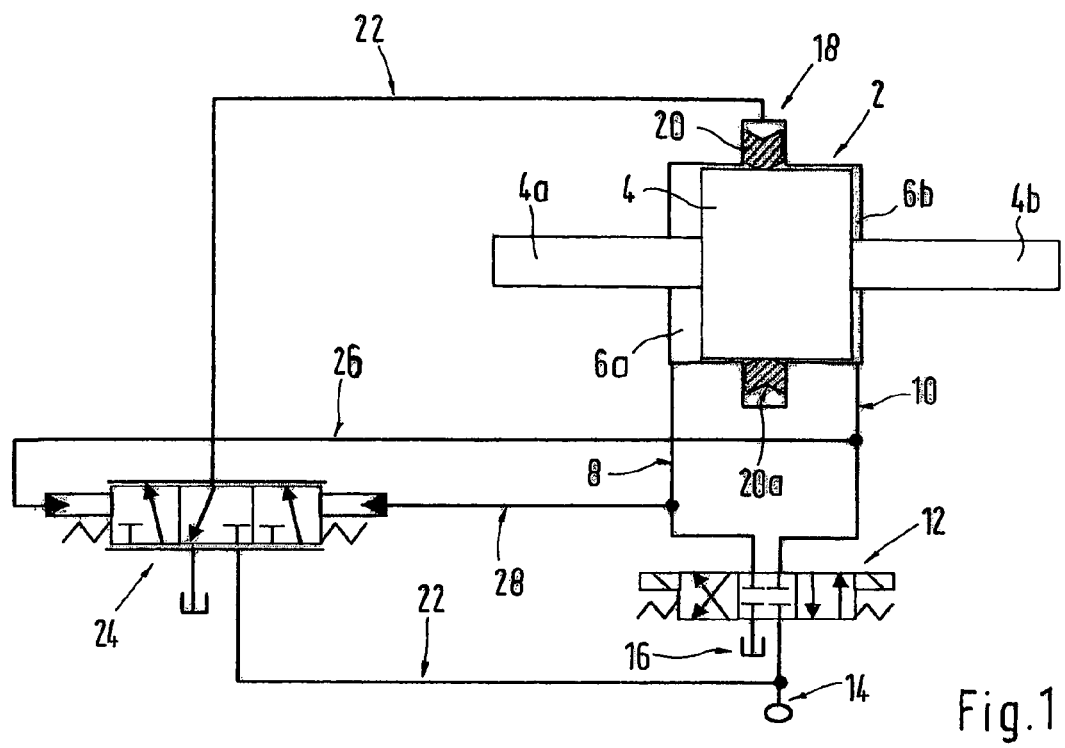
FIG. 1 shows a linear drive having a hydraulic control according to a first exemplary embodiment of the present invention.

The hydraulic linear drive shown in FIG. 1 which may be used as a hydraulic transmission actuator for an automatic transmission, for example, has a cylinder housing 2 accommodating an adjusting piston 4 with a piston rod 4*a* and 4*b* leading out of the cylinder housing 2 to the left and the right respectively. The adjusting piston 4 subdivides the cylinder space into two pressure spaces 6*a* and 6*b* to each of which a corresponding hydraulic line 8 and 10 is connected. The hydraulic lines 8 and 10 lead to an electrically drivable 4/3-switching valve which is connected to an oil tank and a pressure source via connections 14 and 16. Depending on the switch position of the switching valve 12, the hydraulic lines 8, 10 function as a pressure line and/or as a return line into the oil tank.

The cylinder housing 2 has a ring groove 18 concentric with the adjusting piston and having a sealing ring 20 inserted into it. With its inside, the sealing ring 20 forms a seal with respect to the adjusting piston 4, while hydraulic oil acts on its outside via a pressure line 22. A so-called pressure balance 24 is connected to the pressure line 22 and is connected to the hydraulic line 10 and/or 8 via two control lines 26 and 28.

The sealing ring 20 has a groove 20*a* with a V-shaped cross section on its outside, while the cross section on the inside tapers in the direction of the adjusting piston 4.

The additional hydraulic sealing of the sealing ring 20 with respect to the adjusting piston 4 is accomplished in the following manner. If the pressure space 6*a* is filled with hydraulic oil via the hydraulic line 8 to adjust the adjusting piston 4 to the right, for example, then at the same time the pressure balance 24 is acted upon with by hydraulic oil through the control line 28 and the valve element of the pressure balance 24 is displaced to the left so that the ring groove 18 is also filled with hydraulic oil through the pressure line 22. Thus the sealing ring 20 is pressed with its inside against the adjusting piston 4 via this additional hydraulic force so that reliable and secure sealing of the two pressure spaces 6a, 6b during adjustment of the adjusting piston 4 is ensured.

Figure 2:
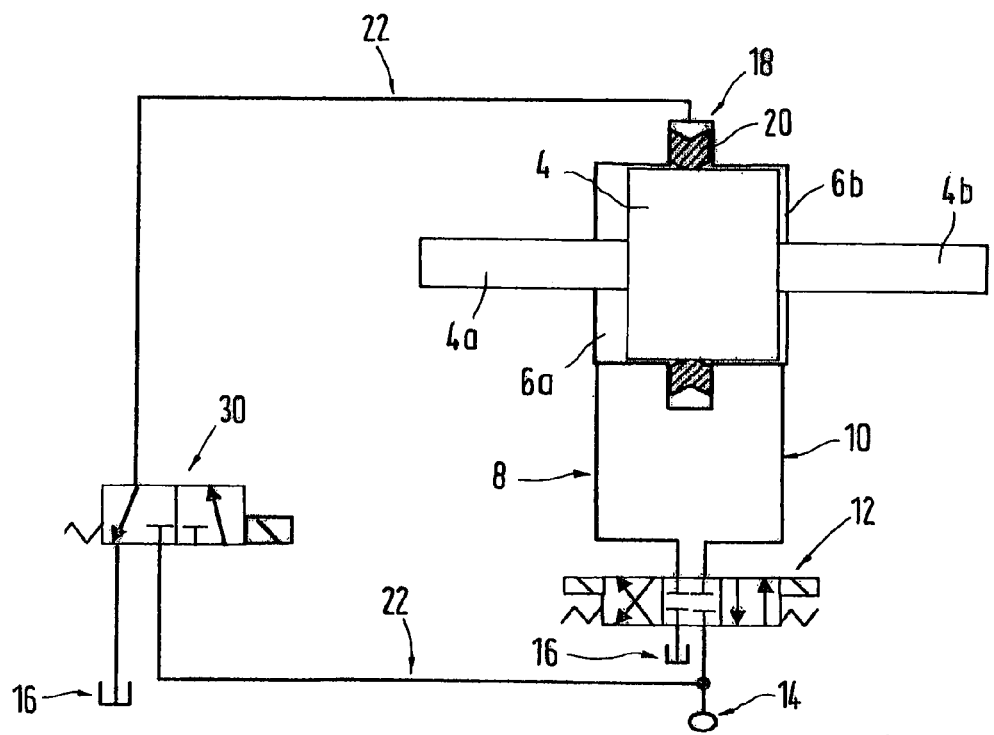
FIG. 2 shows a linear drive having a hydraulic control according to a second exemplary embodiment of the present invention.

The second exemplary embodiment according to FIG. 2 in which the same components are provided with the same reference notation, differs in that instead of the pressure balance 24, a switching valve 30 is integrated into the pressure line 22. Thus the pressure acting on the sealing ring 20 may be activated and deactivated as desired in comparison with the first exemplary embodiment. For example, an increased sealing power is necessary when the linear drive, which is used as a hydraulic transmission actuator, is exposed to increased control forces in the synchronization phase. In this phase, there is a corresponding pressure acting on the sealing ring 20 via the control of the 3/2 switching valve 30, whereas before and after that, the adjusting movement of the adjusting piston 4 may be accomplished without any additional sealing force, if necessary.

The exemplary embodiment depicted in FIG. 2 differs only in the design of the control valve 22', which has only two shift positions a first closed shift position 22'a and a second opened shift position 22'b. Through cycled operation of this control valve 22' the function described previously for controlling the adjusting rate and/or adjusting force of the adjusting piston 4 can also be implemented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Hydraulic linear drive for a transmission actuator comprising:
    a piston/cylinder unit in which an adjusting piston is arranged in a cylinder housing so that the piston is longitudinally displaceable and divides a cylinder housing space into at least two pressure spaces,
    hydraulic lines communicating hydraulic oil to the pressure spaces, and
    a sealing element arranged on one of the adjusting piston and the cylinder housing for mutually sealing the two pressure spaces with respect to one another,
    wherein the sealing element is a sealing ring accommodated in a ring groove on the cylinder housing and sealed on an inside portion thereof with respect to the adjusting piston and arranged to be acted upon by hydraulic oil as a result of longitudinal displacement of the piston on an outside peripheral surface of the sealing ring.

2. Hydraulic linear drive as recited in claim 1, wherein the sealing ring has a groove with a V-shaped cross section on the outside portion thereof, while the cross section on the inside of the sealing ring tapers in a direction toward the adjusting piston.

3. Hydraulic linear drive as recited in claim 2, wherein the differential pressure between the two pressure spaces is tapped with the help of a pressure balancer so that the pressure can act upon the sealing ring.

4. Hydraulic linear drive as recited in claim 2, wherein hydraulic oil pressure fed to the sealing ring is controllable via a switching valve.

5. Hydraulic linear drive as recited in claim 1, wherein hydraulic oil pressure fed to the sealing ring is controllable via a switching valve.

6. Hydraulic linear drive for a transmission actuator comprising:
    a piston/cylinder unit in which an adjusting piston is arranged in a cylinder housing so that the piston is longitudinally displaceable and divides a cylinder housing space into at least two pressure spaces,
    hydraulic lines communicating hydraulic oil through hydraulic lines leading to the pressure spaces, and
    a sealing element arranged on one of the adjusting piston and the cylinder housing for mutually sealing the two pressure spaces with respect to one another,
    wherein the sealing element is a sealing ring accommodated in a ring groove on the cylinder housing and sealed on its inside with respect to the adjusting piston and which can be acted upon by hydraulic oil on its outside,
    wherein the differential pressure between the two pressure spaces is tapped with the help of a pressure balancer so that the pressure can act upon the sealing ring.

7. A linear drive assembly for a vehicle transmission actuator comprising:
    a cylinder housing,
    a longitudinally displaceable adjusting piston disposed in the cylinder housing and dividing the cylinder housing into pressure spaces at opposite sides of the adjusting piston,
    at least one piston rod extending from a respective side of the adjusting piston to outside the cylinder housing for acting on a transmission element to be adjustably moved in response to movement of the piston,
    hydraulic control lines communicating hydraulic fluid to the pressure spaces to thereby adjustably move the piston,
    a sealing ring surrounding the piston and sealing the pressure spaces from one another and arranged to have an outside peripheral surface thereof acted upon by hydraulic fluid, and
    a sealing pressure line communicating the hydraulic fluid to a sealing pressure space surrounding the sealing ring to thereby apply radially inward pressure on the sealing ring.

8. A linear drive assembly according to claim 7, wherein the sealing pressure space is formed as a V-shaped groove on the outside of the sealing ring which narrows in a radial inward direction on the sealing ring.

9. A linear drive assembly according to claim 8, wherein the inside of the sealing ring is tapered toward the adjusting piston so as to have a minimum longitudinal dimension at a surface thereof contacting the adjusting piston.

10. A linear drive assembly according to claim 9, wherein a pressure balancer is disposed to tap differential pressure between the pressure spaces and supply said differential pressure to the sealing line and sealing ring.

11. A linear drive assembly according to claim 9, wherein a switching valve is provided for controlling supply of hydraulic fluid to the sealing line and sealing ring independently of the pressure difference in the pressure spaces at opposite sides of the adjusting piston.

12. A linear drive assembly according to claim 7, wherein the inside of the sealing ring is tapered toward the adjusting piston so as to have a minimum longitudinal dimension at a surface thereof contacting the adjusting piston.

13. A linear drive assembly according to claim 7, wherein the sealing ring is disposed in an annular groove in the cylinder housing.

14. A linear drive assembly according to claim 7, wherein a pressure balancer is disposed to tap differential pressure between the pressure spaces and supply said differential pressure to the sealing line and sealing ring.

15. A linear drive assembly according to claim 7, wherein a switching valve is provided for controlling supply of hydraulic fluid to the sealing line and sealing ring independently of the pressure difference in the pressure spaces at opposite sides of the adjusting piston.

16. A linear drive assembly according to claim 7, wherein hydraulic fluid supply to said hydraulic lines is controlled by an electrically drivable switching valve.

17. A linear drive assembly for a vehicle transmission actuator comprising:
    a cylinder housing,
    a longitudinally displaceable adjusting piston disposed in the cylinder housing and dividing the cylinder housing into pressure spaces at opposite sides of the adjusting piston,
    at least one piston rod extending from a respective side of the adjusting piston to outside the cylinder housing for acting on a transmission element to be adjustably moved in response to movement of the piston,
    hydraulic control lines communicating hydraulic fluid to the pressure spaces to thereby adjustably move the piston,
    a sealing ring surrounding the piston and sealing the pressure spaces from one another, and
    a sealing pressure line communicating hydraulic fluid to a sealing pressure space surrounding the sealing ring to thereby apply radially inward pressure on the sealing ring,
    wherein said sealing pressure line is controllably connected with the hydraulic lines to communicate the hydraulic fluid to the sealing pressure space.

18. A linear drive assembly for a vehicle transmission actuator comprising:
    a cylinder housing,
    a longitudinally displaceable adjusting piston disposed in the cylinder housing and dividing the cylinder housing into pressure spaces at opposite sides of the adjusting piston,
    at least one piston rod extending from a respective side of the adjusting piston to outside the cylinder housing for acting on a transmission element to be adjustably moved in response to movement of the piston,
    hydraulic control lines communicating hydraulic fluid to the pressure spaces to thereby adjustably move the piston,
    a sealing ring surrounding the piston, sealing the pressure spaces from one another and arranged to have an outside peripheral surface thereof acted upon by hydraulic fluid as a result of longitudinal displacement of the piston, and
    sealing pressure means for communicating the hydraulic fluid to apply radial inward pressure on the sealing ring to increase sealing pressure thereof against the piston.

19. Hydraulic linear drive for a transmission actuator comprising:
    a piston/cylinder unit in which an adjusting piston is arranged in a cylinder housing so that the piston is longitudinally displaceable and divides a cylinder housing space into at least two pressure spaces,
    hydraulic lines communicating hydraulic oil to the pressure spaces, and
    a sealing element arranged on one of the adjusting piston and the cylinder housing for mutually sealing the two pressure spaces with respect to one another,
    wherein the sealing element is a sealing ring accommodated in a ring groove on the cylinder housing and sealed on an inside portion thereof with respect to the adjusting piston and arranged to be acted upon by hydraulic oil on an outside peripheral surface thereof, the sealing ring being acted upon by the hydraulic oil only during a synchronization phase in which the hydraulic linear drive is operative as the transmission actuator.

* * * * *